US008527012B2

(12) United States Patent
Wright-Riley (10) Patent No.: US 8,527,012 B2
(45) Date of Patent: Sep. 3, 2013

(54) APPARATUS AND METHOD OF MOBILE MEDIA PRESENTATION DOCKING STATION FOR PORTABLE ELECTRONIC DEVICE

(71) Applicant: General Instrument Corporation, Horsham, PA (US)

(72) Inventor: Patrick Wright-Riley, Villanova, PA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/677,282

(22) Filed: Nov. 14, 2012

(65) Prior Publication Data

US 2013/0073695 A1 Mar. 21, 2013

Related U.S. Application Data

(63) Continuation of application No. 11/960,365, filed on Dec. 19, 2007, now abandoned.

(51) Int. Cl.
*H04M 1/00* (2006.01)
*H04B 1/38* (2006.01)
(52) U.S. Cl.
USPC .......................................... 455/566; 455/66.1
(58) Field of Classification Search
USPC ................. 455/566, 41.3, 41.2, 556.1, 556.2, 455/557, 550.1, 66.1; 345/1.1, 1.2, 2.1, 2.2, 345/2.3
See application file for complete search history.

(56) References Cited

U.S. PATENT DOCUMENTS

| 7,725,362 B2 * | 5/2010 | Weathers, Jr. ................ 705/26.8 |
| 2004/0088452 A1 | 5/2004 | Scott |
| 2007/0236482 A1 * | 10/2007 | Proctor et al. ................ 345/204 |
| 2007/0247794 A1 * | 10/2007 | Jaffe et al. .................... 361/681 |
| 2008/0140886 A1 | 6/2008 | Izutsu |
| 2009/0164688 A1 | 6/2009 | Wright-Riley |

FOREIGN PATENT DOCUMENTS

| JP | 2002-111802 | 12/2002 |
| JP | 2003-070042 | 7/2003 |
| JP | 2007-060646 | 8/2007 |

OTHER PUBLICATIONS

Office Action, Japanese App. No. 2010-539629 (Foreign Text), Aug. 21, 2012.
UKIPO Search and Examination Report, RE: Application #GB1217393.6, Oct. 25, 2012.

* cited by examiner

*Primary Examiner* — Lewis West (57) ABSTRACT

A portable electronic device has a wireless receiver configured to receive wireless content, a communication interface configured to interface to a docking station having at least one connected media presentation host device, and content reproduction circuitry. The content reproduction circuitry is configured to determine a format required by the media presentation host device and stream the content to the host device through the communication interface in the required format.

20 Claims, 9 Drawing Sheets

APPARATUS AND METHOD OF MOBILE MEDIA PRESENTATION DOCKING STATION FOR PORTABLE ELECTRONIC DEVICE

BACKGROUND

Portable electronic devices provide users with an ever-increasing array of features and capabilities. For example, wireless telephones, personal digital assistants, smart phones, pocket computers and similar devices allow users to manage data, make phone calls and send or receive text or email messages.

Additionally, many portable electronic devices can provide a wireless connection to the Internet. This connection may be provided, for example, through a wireless or wi-fi hot-spot or through a network of transceiver stations disposed throughout a service area, such as a mobile telephone network. Many different systems and protocols can be used to wirelessly connect a portable electronic device to the Internet or other computer network through the system of a wireless service provider.

With access to the Internet or other service provide computer network, portable electronic devices are increasingly able to provide access to a wide variety of audio and audio-visual media content. For example, using a portable electronic device, a user may be able to download or stream audio or audiovisual content such as songs, news footage, video clips, music videos, movies, television programs, etc. Any audio, visual or audiovisual content can be downloaded or streamed to these portable electronic devices.

This access to an unlimited variety of content through portable electronic devices is particularly helpful for users because the content can be accessed and enjoyed from any location within the wireless service area that supports the portable electronic device. Consequently, the user can access desired audio or audiovisual content when away from home or office, for example, when traveling, waiting for an appointment, doing errands, etc.

However, portable electronic devices are, by their nature, compact in size so as to be easily carried on the user's person. As a result, the display device on a portable electronic device is typically quite small, which may effect the user's ability or desire to watch streamed video content on the portable electronic device.

Additionally, when listening to audio using a portable electronic device, the user must typically wear earphones or headphones. This prevents those near the user from having to listen to the audio being enjoyed by the user. Additionally, ear or headphones conserve the limited power in a portable electronic device as compared to the power that would be required to operate larger speakers if the user were not wearing headphones.

Watching a relatively tiny display device and/or using an earpiece or headphones may be satisfactory to enable portability. However, the user may sometimes be in the process of viewing and/or listening to content on the portable electronic device when the user arrives at his or her home or office or some other place where the user could access a device with a larger, higher density display, higher quality speakers, or other enhanced features for playback of the audiovisual content.

In such a case, the user typically must finish watching the desired content on the relatively inconvenient, small display of the portable electronic device or discontinue watching the desired content on the portable device and then activate another device, such as a computer or set-top box, and restart, most likely at addition cost, the download or stream of the desired content to the new device which provides the advantage of a larger screen, speakers and/or enhanced user interface.

Clearly, it is inconvenient to discontinue viewing content on a portable device and re-access the content on another device, at additional cost. While the second device may provide a larger screen or other features that make it easier to enjoy the content, the user will waste time transitioning between devices. Additionally, the user may have to start again at the beginning of the program or content, even though a substantial portion has already been experienced on the portable device.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

To address the issues presented by the ability to download or stream content to a portable electronic device, but possibly wanting to transition the experience of that content to a device with a larger display or other features for enhancing the user's enjoyment of the content, the present specification describes a novel system in which the portable electronic device can be selectively connected to, or brought into communication with, a second audiovisual playback system that provides or includes a larger display or other features for enhancing the user's enjoyment of the content. As described herein, this interfacing of the portable electronic device and the second audiovisual playback system can automatically initiate playback of the content, without interruption or needing to restart or re-access the content, on the second audiovisual system.

As used herein and in the appended claims, the term "portable electronic device" is used to refer to any portable electronic device that can be used to experience audio, visual, or audio visual content, particularly where the content is provided to the portable electronic device wirelessly through a supporting wireless network. Consequently, the term "portable electronic device" may include, but is not limited to, personal digital assistants (PDAs), cellular and mobile telephones, smart phones, MP3 players, portable global positioning system (GPS) units, portable satellite receivers, pocket and laptop computers and the like. It will be recognized by those skilled in the art that new portable devices continue to be developed and marketed to consumers who use them for a variety of purposes. Such new portable devices may also be included in the broad definition of a portable electronic device for purposes of the present specification and the techniques disclosed.

As used in the present specification and in the appended claims, the term "content" or "media content" refers to any audio, visual or audiovisual data including, but not limited to, still images with or without audio, video images with or without audio, audio content only, and any combinations thereof. Examples of such content may include broadcast television content, pay-per-view content, video on demand content, music videos, music without video, email messages, electronic text, ebooks, video books, web pages and others.

As used in the present specification and in the appended claims, the term "host device" will be used to refer to an electronic content playback device. Typically, the host device will include or provide a relatively large screen, speakers and/or other features that tend to improve or enhance a user's enjoyment of media content being played back as compared to playback on a portable electronic device. Typically, the host device is generally a non-portable device, but this is not necessarily so.

As used in the present specification and in the appended claims, the term "docking station" refers to an electronic device configured to communicatively couple or interface a portable electronic device and a host device. The docking station may physically support or house the portable electronic device, but this is not necessarily so. In some embodiments, the docking station is specifically configured to transmit media content from the portable electronic device to the host device. In this way, the user can seamlessly transition between experiencing content playback on the portable electronic device to playback of the same content on the host device.

To overcome the issues described above, the present specification discloses various embodiments of systems that allow a user to seamlessly shift playback of media content between a portable electronic device and a host device that can interface with the portable device. Some of these embodiments include a docking station for the portable electronic device. In such embodiments, a first communication interface is configured to interface the portable electronic device and the docking station. A second communication interface is configured to interface the docking station with the host device. In some embodiments, the docking station is configured to detect when the portable electronic device is interfaced with the docking station and automatically supersede and replace existing media content being replayed on the host device with the content from the portable electronic device. The media content may be transmitted to the host device in a format supported by the host device.

Additionally, the present specification discloses a method of mobile media presentation, including the steps of detecting a new interface between a host device and a portable electronic device, superseding other means of content delivery associated with the host device, receiving streaming media content from the portable electronic device, streaming the media content to the host device in a format compatible with the host device, and presenting the media content on the host device.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of media content presentation.

Illustrative Systems

Figure 1:
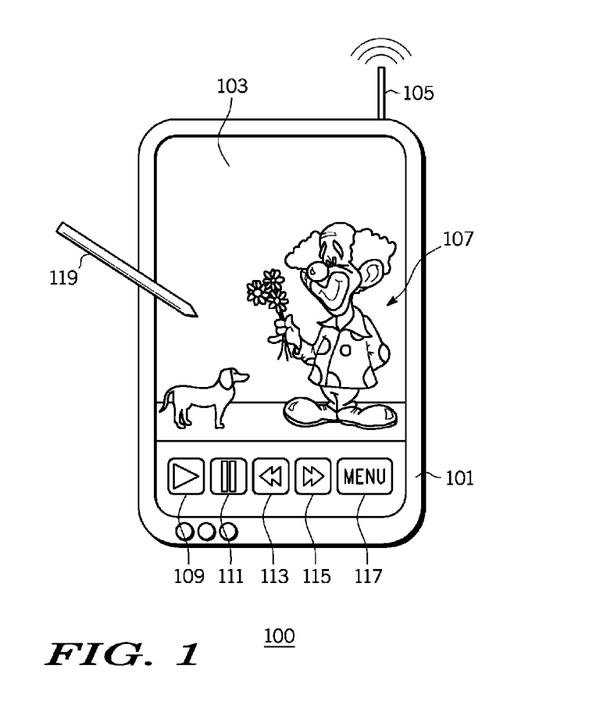
FIG. 1 is a perspective diagram of an illustrative portable electronic device.

Referring now to FIG. 1, an illustrative portable electronic device (100) is shown according to the principles described herein. The illustrative portable electronic device (100) has a main case or housing (101), a screen (103), which may be a touch-sensitive screen in some embodiments, and a user interface.

In the illustrated example, the screen (103) is a touch-sensitive screen, and the user interface includes "soft button" style controls (109, 111, 113, 115, 117) displayed on a lower portion of the screen (103). Consequently, the "soft button" controls (109, 111, 113, 115) of the portable electronic device (100) may be operated by pressure on the touch-sensitive screen with a stylus (119), a user's finger or the like.

In other embodiments, where a touch-sensitive is not necessarily used, the user interface of the portable electronic device (100) may include physical buttons on the housing (101) that provide various functions when actuated depending on a label displayed in connection with that physical button on the display screen (103). In still other embodiments, physical buttons in the housing (101) may have predetermined functions that do not change.

The exemplary portable electronic device (100) is shown displaying video content (107) on the screen (103). In some embodiments, the media content (107) is transmitted wirelessly to an antenna (105) of the portable electronic device (100). The antenna (105) may be internal or external to the portable electronic device (100). In some embodiments, the user of the portable electronic device (100) may receive paid media content from a cellular or mobile network provider. In other embodiments, the video media content (107) may be received wirelessly through internet access provided by a wireless computer network (also referred to as a "Wi-Fi" network) or a connection to another electronic device, such as a computer or another portable electronic device. In still other embodiments, the media content (107) may be content that is broadcast generally to the public, such as a television broadcast.

In some embodiments, the video media content (107) reproduced by the portable electronic device (100) may be content that was downloaded to the portable electronic device (100) and stored on a hard disk or other electronic storage device (e.g. flash RAM) of the portable electronic device (100). In other embodiments, the video media content (107) may be streamed or streaming to the portable electronic device (100) through the wireless connection described above.

The portable electronic device (100) and/or software running on the portable electronic device (100) may be designed to facilitate the manipulation of the media content (107) that is being reproduced on the screen (107). For example, some of the "soft button" controls (109, 111, 113, 115) may be used to affect the rate or direction of a playback mode. Additional options may be adjusted, or additional functions provided, through the menu "soft button" control (117). Similar control functions can be provided regardless of the type of user interface provided with the portable device (100).

As noted above, in various different embodiments, the portable electronic device (100) may be a personal digital assistant (PDA), a cellular or mobile phone, a personal media player, or other generic device. In such embodiments, the portable electronic device (100) may have special software installed permitting the user to access media content that is stored on, or wirelessly transmitted to, the portable electronic device (100). In other embodiments, the portable electronic device (100) may be specifically designed for the purpose of receiving the wireless transmission of the media content (107) from a specific provider and then reproducing or playing back the media content (107).

In any case, the portable electronic device (100), as will be described in detail below, is configured to be selectively interfaced with a host device to enhance the user's experience in playing back the media content (107). In such instances, the portable electronic device (100) becomes a content source for the host device.

Figure 2:
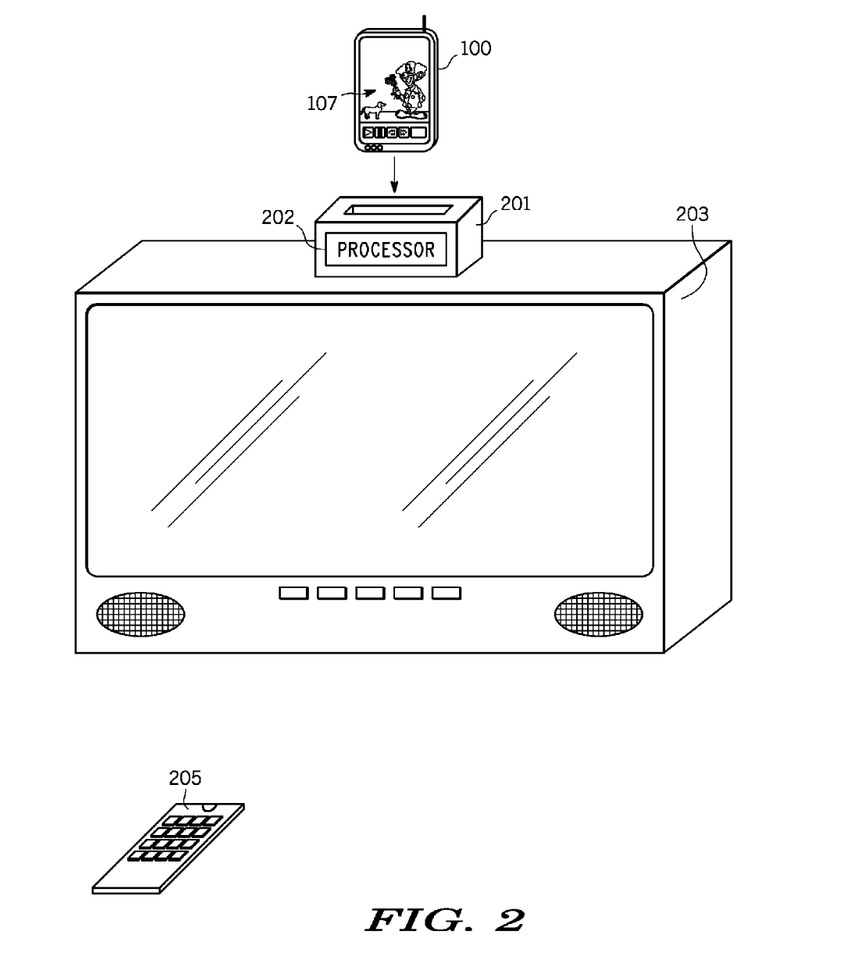
FIG. 2 is a diagram of an illustrative portable electronic device being inserted into an illustrative docking station.

Referring now to FIG. 2, the portable electronic device (100) is selectively interfaced with a host device (203) to enhance the user's experience in playing back the media content (107). The docking station (201) may comprise a processing element (202) configured to run firmware, software or a combination thereof (referred to collectively herein as "software"). Examples of suitable processing elements (202) include, but are not limited to, microprocessors, computing devices, application specific integrated circuits (ASICs), Field Gate Programmable Arrays, and combinations thereof. The software running on the processing element (202) may be configured to convert the media content received from the portable electronic device (100) into a format supported by the host device (203). In some embodiments, the software may identify the format supported by the host device (203) and request media content from the portable electronic device (100) in the format supported by host device (203), if available.

As shown in FIG. 2, the portable electronic device (100) is designed to be interfaced with, connected to, supported by and/or housed in, a docking station (201). In some embodiments, the docking station may simply be a cable connected to a port of the portable electronic device (100). In still other embodiments, the docking station (201) may be a wireless transceiver for interfacing wirelessly with the portable electronic device (100) whether or not the two are in physical contact. In the illustrated example of FIG. 2, the docking station (201) includes a cradle for receiving and physically supporting the portable electronic device (100) as well as providing a data communication path between the portable electronic device (100) and the host device (203). The docking station (201) may be separate from, or integrated in, the host device (203). In either case, the docking station (201) is communicatively coupled with the host device (203).

When a user desires playback media content (107) that is received or stored by the portable electronic device (100) to be presented on the host device (203), the portable electronic device (100) is interfaced with the docking station (201). When interfaced with the docking station (201), the portable electronic device (100) transmits the data needed to display the desired media content (107) on the host device (203).

In the present example, the host device (203) is shown as a large screen monitor or television device. However, the host device (203) may be any device suitable for reproducing the media content (107) from the portable electronic device (100), for example, a computer system or set-top box and monitor system. In some embodiments, the content (107) is video content and utilizes both a display and speakers. In other embodiments, the media content (107) is only audio, and speakers may suffice as the host device (203). In yet other embodiments, the content (107) may include any combination of still or active video and/or audio.

Figure 3:
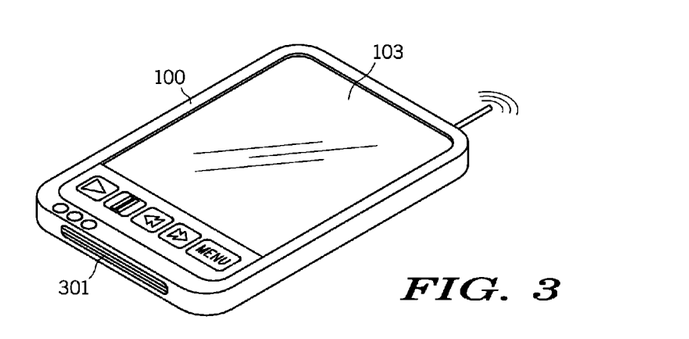
FIG. 3 is a perspective diagram of another view of an illustrative portable electronic device.

As indicated, there are a number of different arrangements for communicatively interfacing the portable electronic device (100) and the docking station (201). In many embodiments, this interface is electrical. FIG. 3 shows an example of a portable electronic device (100) that has an electrical connector (301) disposed on one edge of the portable electronic device (100). The electrical connector (301) is configured to mate with a corresponding electrical connector in the docking station (201, FIG. 2), thus establishing data communication between the portable electronic device (100) and the docking station (201, FIG. 2). The electrical connector (301) may have a plurality of individual pins or electrical traces.

In other embodiments, the communication interface between the portable electronic device (100) and the docking station may be obtained using optical or wireless means. For example, returning to FIG. 2, the portable electronic device (100) and the docking station (201) may both have hardware and software that enable BlueTooth communication or infrared (IR) communication between the portable electronic device (100) and the docking station (201). Many types of communications systems are available in the art, and any of these that enable bilateral communication between the portable electronic device (100) and the docking station (201) may be used in accordance with the principles of the present specification.

Still with reference to FIG. 2, the interface between the portable electronic device (100) and the docking station (201) can carry several different types of signals including a media content signal, control signal and power. In some embodiments, increased data bandwidth is achieved by transmitting media content over several individual pins of the connector (301, FIG. 3) from the portable electronic device (100) to the docking station (201). In other embodiments, additional electrical connections between the portable electronic device (100) and the docking station (201) may be used to provide control signals or power to the portable electronic device (100).

In some embodiments, a remote control device (205) may be in communication with the docking station (201) or the host device (203) and provide user input through the docking station (201) to the portable electronic device (100) such that the media content is manipulated according to a user's preferences. In other examples, the remote control device (205) may communicate directly with the portable device (100).

Figure 4:
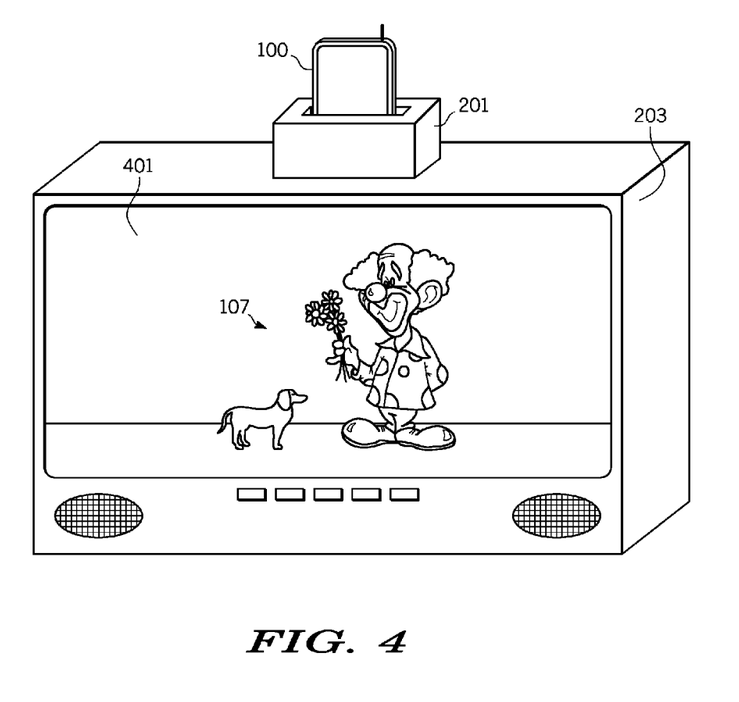
FIG. 4 is a diagram of media content from an illustrative portable electronic device being displayed on an illustrative host device of an illustrative docking station.

Referring now to FIG. 4, the portable electronic device (100) is shown docked in the docking station (201). The docking station (201) is in communication with the host device (203), which is displaying the media content (107) from the portable electronic device (100) on a display or screen (401).

The media content from the portable electronic device (100) is displayed on the screen (401) of the host device (203) in a format and resolution used by the host device (203). As will be appreciated by those skilled in the art, and as demonstrated by the present example, a wide disparity between resolution and display sizes may exist between the portable electronic device (100) and the host device (203) or between different host devices. Thus, media content that is of an acceptable format and resolution for the portable electronic device (100) may not necessarily be suitable for display by the host device (203). This difference between the inherent display characteristics of the portable (100) and host (203) devices can be addressed in a number of ways.

In some embodiments, the docking station (201) is configured to detect when the portable electronic device (100) is connected to, or otherwise interfaced with, the docking station (201). In response, the docking station (201) will signal the host device (203) to supersede or replace any existing media content being displayed on the host device (203) with the content incoming from the portable electronic device (100). For example, if the host device (203) is displaying some media content from some source other than the portable electronic device (100), the docking station (201) may automatically switch the input source of media content in the host device (203) to the media content (107) received from the portable electronic device (100) upon establishing an interface with the portable electronic device (100), thus superseding the existing media content on the host device (203). The docking station (201) may accomplish this by sending a special control signal to the host device (203) once an interface with the portable electronic device (100) is detected by the docking station (201).

In some embodiments, the portable electronic device (100) may only be able to transmit media content (107) to the docking device (201) in a limited number of formats, none of which are compatible with the host device (203). In these cases, the docking station (201) may be configured to receive the media content (107) from the portable electronic device (100) in a first format and reconvert the media content (107) to a second format that is compatible with the host device (203) prior to outputting the media content (107) to the host device (203) for playback. This conversion by the docking station (201) may occur in real-time in some embodiments and on a time-delayed basis in others.

In some cases, different docking stations (201) may be produced for use with different host devices (203). In other cases, universal docking stations (201) are configured to convert media content to all, or at least the most likely, formats that may be used. Still in other embodiments, programmable docking stations (201) may be flexibly configured by a user or operator to convert media content (107) from one specific format to another.

Still in other embodiments, the portable electronic device (100) may be configured to transmit media content (107) to the docking station (201) in a plurality of different formats. The appropriate media content (107) format for the host device (203) may be selected from among the available formats by the docking station (201) and relayed to the host device (203).

In other examples, the correct format for the host device (203) may be communicated to the portable electronic device (100) automatically through the docking station (201) by the docking station (201), host device (203) or user input. The portable electronic device (100) can then discontinue outputting the media content (107) in any but the indicated format.

Figure 5:
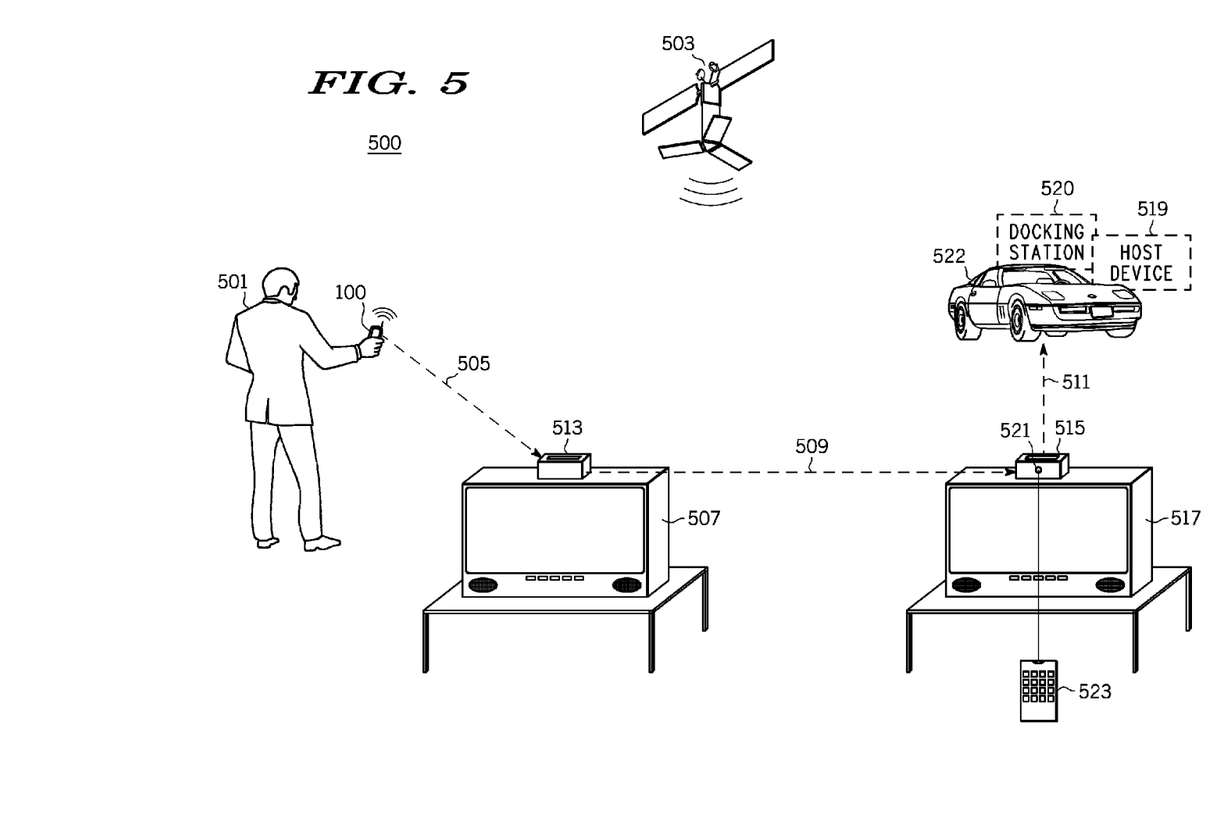
FIG. 5 is a diagram of an illustrative system of mobile media presentation.

Referring now to FIG. 5, an illustrative system (500) of mobile media presentation is shown. The system (500) includes a plurality of host devices (507, 517, 519) and at least one portable electronic device (100) operated by a user (501).

The illustrative system (500) includes a satellite transmitter (503) in wireless communication with the portable electronic device (100). The satellite transmitter (503) of this example provides the portable electronic device (100) with streaming or downloaded media content (107, FIG. 1) which may be played, paused, or otherwise reproduced by the portable electronic device (100). In other embodiments, the media content (107, FIG. 1) may be provided to the portable electronic device (100) via a cellular-type transmitter, a Radio Frequency (RF) transceiver, a Bluetooth transceiver, a public broadcast antenna, or the like. In any of these embodiments, the media content (107, FIG. 1) may be stored electronically in the portable electronic device (100) or streamed in real time.

Each of the host devices (507, 517, 519) has a corresponding docking station (513, 515, 520) configured to interface with a portable electronic device (100). As explained above, interfacing the portable device (100) and a host device enables the host device to display media content (107, FIG. 1) received from or through the portable electronic device (100).

As shown in FIG. 5, one of the host devices (519) may be installed inside an automobile (522). As in other instances, a docking station (520) corresponding to the host device (519) is provided in the automobile (522). The docking station (520) inside the vehicle (522) permits the transfer of media content (107, FIG. 1) from the portable electronic device (100) to an interior display and speakers (519) accessible by passengers.

The system (500) illustrated in FIG. 5 exhibits true seamless mobility of the playback of the media content (107, FIG. 1). The portable electronic device (100) constantly receives the media content (107, FIG. 1) regardless of physical changes in location. The dotted lines (505, 509, 511) represent an exemplary path of the portable electronic device (100) between different host devices (507, 517, 519).

In accordance with the present example, the portable electronic device (100) may be constantly receiving a stream of media content (107, FIG. 1) from the satellite transmitter (503). The portable electronic device (100) may initially be interfaced with the first host device (507) and displaying the content (107, FIG. 1) on the first host device (507) through the docking station (513). A user (501) of the portable electronic device (100) may then desire to change locations and display the media content (107, FIG. 1) on another host device (517) via the corresponding docking station (515). This second host device (517) may be in another room or building or may provide features desired by the user that are unavailable with the first host device (507) or the second host device (517) may simply be in another location to which the user (501) wants to move.

Eventually, the user (501) may undock the portable electronic device (100) from the second host device (517) and connect the portable electronic device (100) to a docking station (520) associated with the host device (519) in the automobile (522). The automobile host device (519) may then display the media content (107, FIG. 1) on an interior audio-visual system of the automobile (522).

Throughout the changes in location, the user (501) may receive the media content (107, FIG. 1) from a single source (e.g., 503). The user (501) may also seamlessly transport the playback of the media content (107, FIG. 1) from location to location without loss of media content in the interim or restarting the program at each location.

When not interfaced with any of the host devices, the portable device (100) itself may play back the media content that the user has selected, depending on user preference. In some embodiments, the media content (107, FIG. 1) may be paused by the portable electronic device (100) during transfers between docking stations (513, 515, 520). In other embodiments, the user (501) may view the media content (107, FIG. 1) on the display of the portable electronic device (100) while transporting the portable electronic device (100) between host devices (507, 517, 519).

Docking station (515) is shown having a sensor (521) that is configured to receive signals from a remote control device (523). The signals from the remote control may control certain playback aspects of the media content (107, FIG. 1). Any or all of the docking stations in the illustrated example may be controllable with the same or separate remote control devices. Examples of playback aspects that the remote control signals may affect include, but are not limited to, playback speed, playback sequence, playback volume, and playback resolution. Once the signals from the remote control device (523) are detected at the sensor (521), the appropriate control signals may be sent to the portable electronic device (100) by the docking station (515). In other embodiments, the remote control device (523) may communicate directly with the portable device (100).

Figure 6:
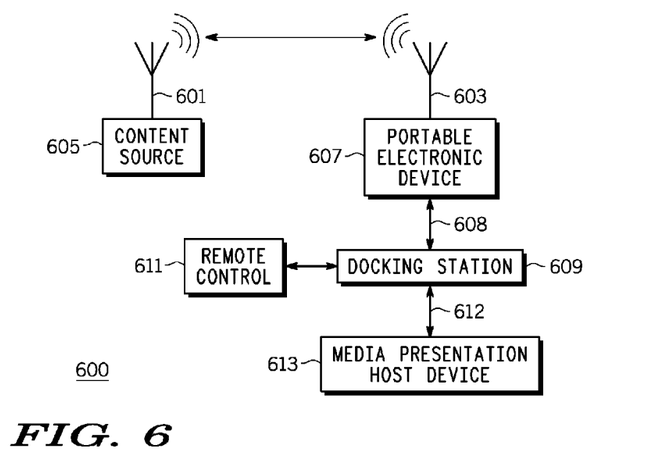
FIG. 6 is a block diagram of an illustrative system of mobile media presentation.

Referring now to FIG. 6, an illustrative system (600) of mobile media presentation (600) is shown. The system (600) includes a content source (605) in communication with a portable electronic device (607). The content source (605) may be a subscription-based network provider, an internet server via a wireless network, a device on an ad-hoc type network, or the like. In the illustrated example, the content source (605) and portable electronic device (607) each have an antenna (601, 603, respectively), thus enabling wireless communication between the content source (605) and the portable electronic device (607). However, other communication systems between the content source (605) and the portable electronic device (607) could be used.

The portable electronic device (607) is also in communication with a docking station (609) through a first communication interface (608). The docking station (609) is in communication with a host device (613) through a second communication interface (612), according to principles described previously in the present specification. In some embodiments, the docking station (609) is configured to detect to the interface (608) with the portable electronic device (607), when established, and supersede existing media content then being presented on the host device (613). Media content is then transmitted from the portable electronic device (607) to the host device (613) for playback via the docking station (609).

The docking station (609) of the present example is also in communication with a remote control device (611). The docking station (609) may have a sensor configured to detect signals from the remote control device (611). The processing element (610) may decode the signals from the remote control device (611) and interact accordingly with the portable electronic device (607). The signal from the remote control device (611) may be configured to control certain playback aspects of the media content, such as, but not limited to, playback speed, playback sequence, playback volume, playback resolution, and combinations thereof.

Figure 7:
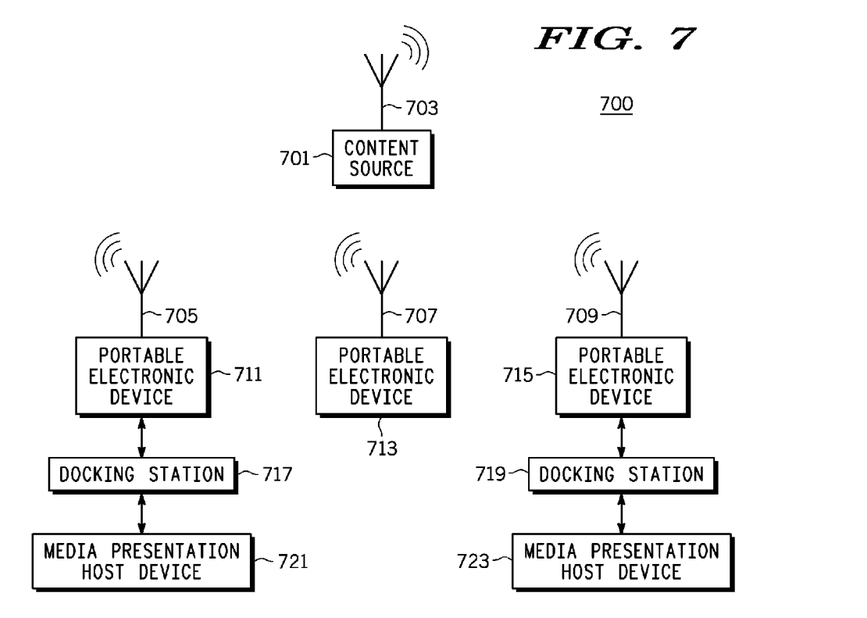
FIG. 7 is a block diagram of an illustrative system of mobile media presentation.

Referring now to FIG. 7, another illustrative system (700) of mobile media presentation is shown. In the example of FIG. 7, a single content source (701) may be in communication with a plurality of portable electronic devices (711, 713, 715) through respective antennas (703, 705, 707, 709). The content source (701) may be broadcasting the same media content to each of the portable electronic devices (711, 713, 715). In other embodiments, the portable electronic devices (711, 713, 715) may receive different media content from the same content source (701) by multiplexing signals in the frequency domain or the time domain, addressing data packets to specific devices, multicast addressing, or using other methods available in the art.

Two of the portable electronic devices (711, 715) are shown in communication with docking stations (717, 719, respectively), which are, in turn, in communication with host devices (721, 723). The media content may be transmitted to the portable electronic devices (711, 713, 715) regardless of the docking status of the portable electronic devices (711, 713, 715). However, in some embodiments, the resolution and/or format of the media content transmitted to a particular portable electronic device (711, 713, 715) may vary according to that device's docking status and the type of host device (721, 723) associated with the docking station (711, 715) to which the portable device (711, 715) is interfaced. Specifically, the content source (701) may provide media content that is formatted for a particular host device (e.g., 721) when signaled that the corresponding portable electronic device (e.g., 711) is interfaced with that particular type of host device (721).

Figure 8:
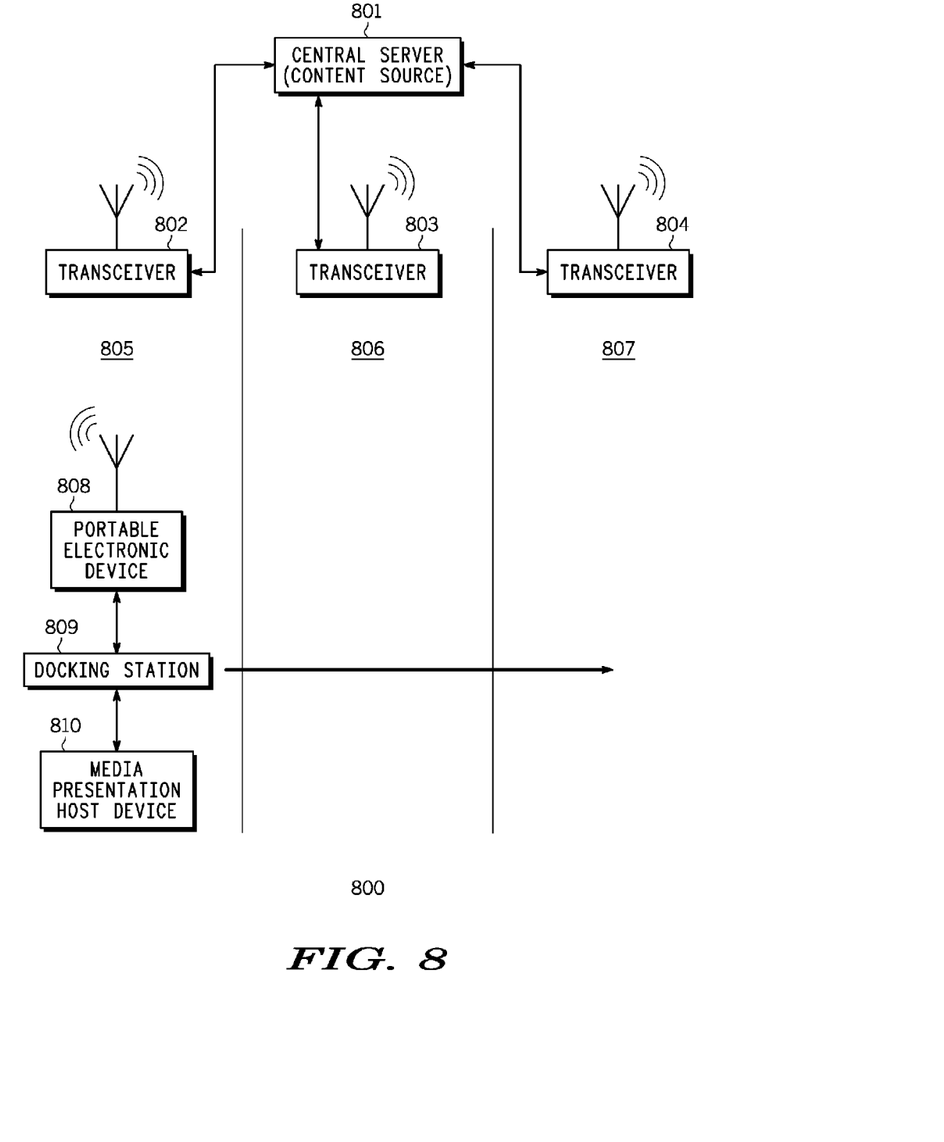
FIG. 8 is a block diagram of an illustrative system of mobile media presentation.

Referring now to FIG. 8, a cellular network may be used to transmit the media content to a portable electronic device (808). An illustrative system (800) of mobile media presentation is shown having a plurality of transceivers (802, 803, 804) in communication with a central server (801) that acts as a content source. The transceivers (802, 803, 804) are each associated with a certain geographic region (805, 806, 807) or "cell." Together all the cells make up a service area.

The portable electronic device (808) may travel within the service area, crossing from one geographic region (805, 806, 807) into another, during the course of a media content transmission. Consequently, the transceiver (802, 803, 804) providing the media content to the portable electronic device (808) may be switched to that transceiver (802, 803, 804) corresponding to the geographic region (805, 806, 807) occupied by the portable electronic device (808) at any given time. In this way, continuity of the media content stream and playback may be provided through the portable electronic device (808).

As in earlier examples, the portable electronic device (808) of the present example may be interfaced with a docking station (809) and, by extension, a media presentation host device (810) that is configured to display the media content received by the portable electronic device (808). The docking station (809) and host device (810) of the present example are portable, and remain in communication with the portable electronic device (808) as the portable electronic device (808) moves between the various geographic regions (805, 806, 807) of the service area. In some embodiments, the docking station (809) and media presentation host device (810) may be associated with an automobile, thus appearing to be mobile while located in a single entity.

Alternatively, the portable electronic device (808) may disconnect from the docking station (809) and host device (810) prior to or during transportation. In some embodiments, additional docking stations with accompanying media presentation host devices may be available in the other geographic regions (805, 806, 807).

Illustrative Methods

Figure 9:
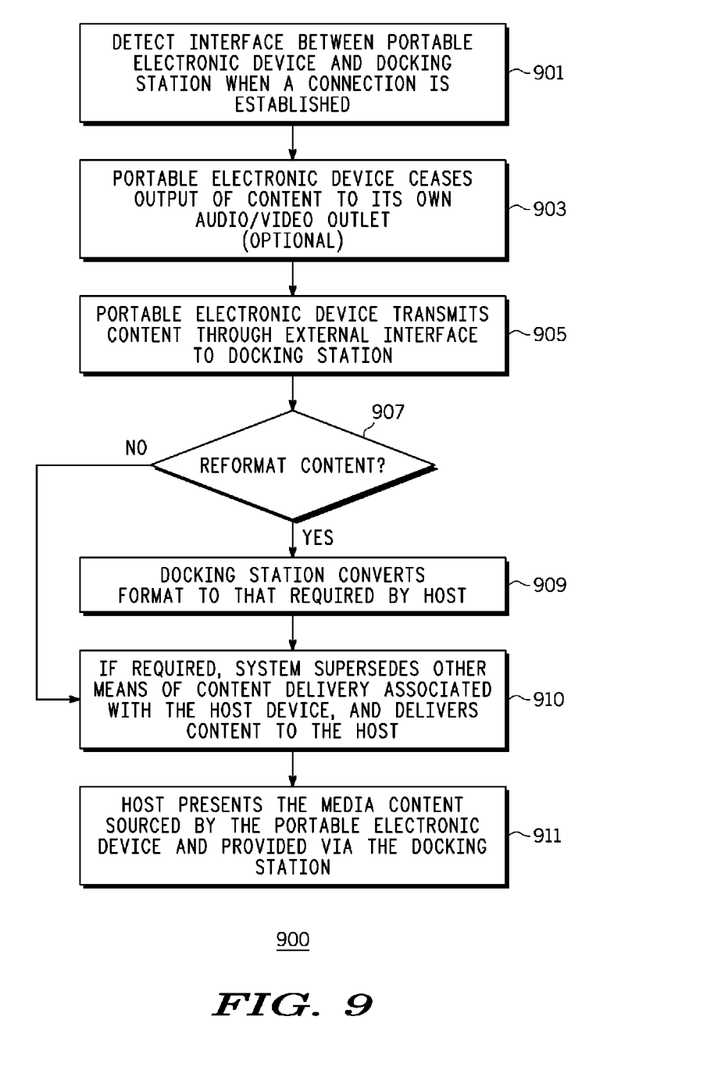
FIG. 9 is a block diagram of an illustrative system of mobile media presentation.

Referring now to FIG. 9, a flowchart of an illustrative method (900) of mobile media presentation is shown. The illustrated method (900) may be executed within a docking station that is interfaced or in communication with a portable electronic device and a media presentation host device. The method (900) includes the step of detecting (step 901) the interface with the portable electronic device, when established. The newly established interface may be detected when communication between the host device and the portable electronic device is established through the docking station. The portable electronic device or the docking station may then signal to the host device that media content is available from the portable electronic device In some embodiments, the portable electronic device may then cease outputting the content using its own hardware and user interface. (step 903). In any case, the portable electronic device then transmits the content through the external interface with the docking station (step 905).

In some embodiments, data is provided to the portable electronic device already in a format compatible with the host device. In such cases, the content can be streamed unchanged from the portable electronic device to the host through the docking station. In other embodiments, the format of the content as initially received by the portable electronic device may not be compatible with the host device. Thus, it may be determined whether the content should be reformatted for the host device (decision 907). If reformatting is indicated, the docking station may convert the format of the content to a format used by the host device (step 909). Although, in alternative embodiments, this conversion may be performed by some other system component.

The media content is then presented (step 911) on the host device to a user. In some embodiments, other means of content delivery associated with the host device are then superseded (step 910). In other words, the host device does not playback media content received from any source other than the portable electronic device throughout the duration of the transmission of media content from the portable electronic device. Additionally, in some embodiments, the way in which the media content is presented on the host device may be altered in response to input from a remote control device.

Figure 10:
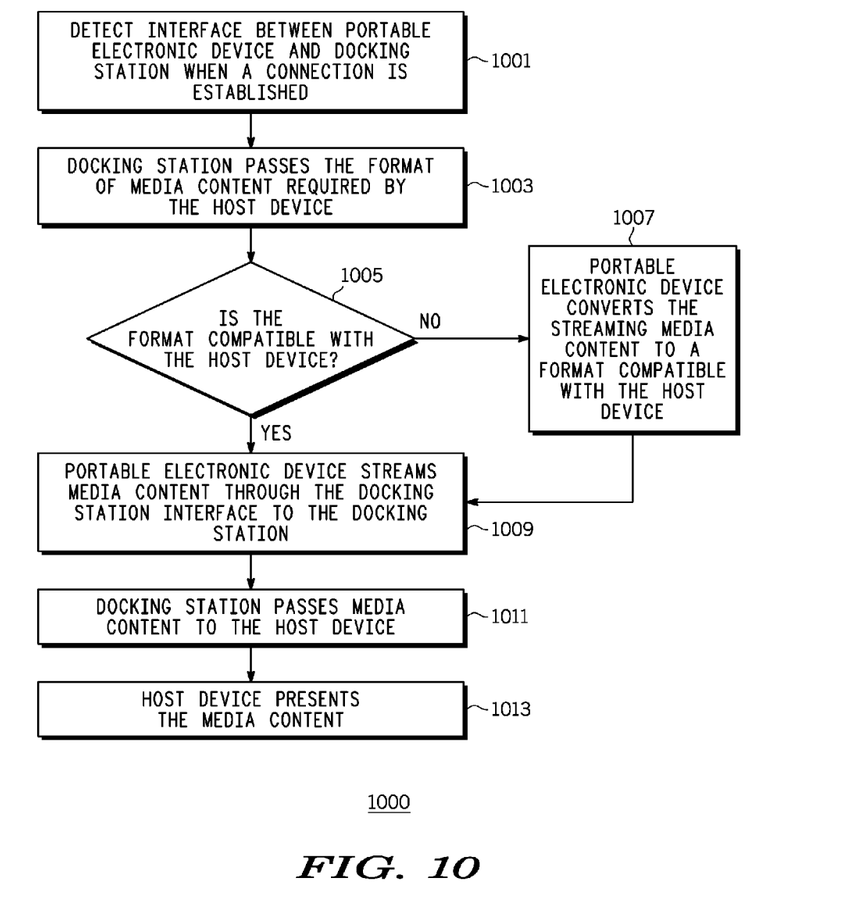
FIG. 10 is a block diagram of an illustrative portable electronic device.

Referring now to FIG. 10, a flowchart of another illustrative method (1000) of mobile media presentation is shown. The method (1000) includes the step of detecting (step 1001) an interface with the portable electronic device, when established.

Streaming media content is received (step 1003), by the docking station, from the portable electronic device, and the format of the media content is then determined (step 1005). The docking station determines (decision 1007) if the format of the media content is compatible with the host device. If the format is not compatible with the host device, the streaming media content is converted (step 1009), by the docking station, to a format compatible with the host device. The media content is then streamed (step 1011) to the host device in a format compatible with the host device, where it is presented (step 1013) to a user. In the event that the format of the media content is found (decision 1007) to be compatible with the host device, the media content is simply streamed (step 1011) to the host device, where it is presented (step 1013) to the user.

Figure 11:
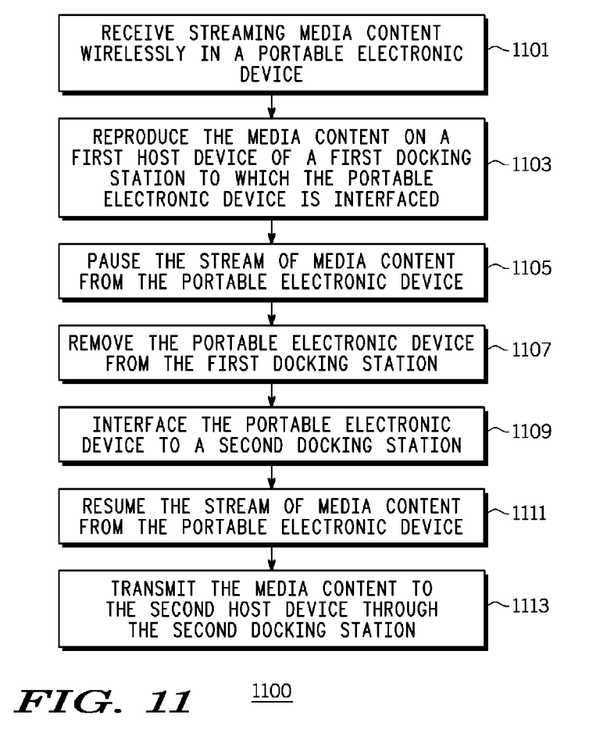
FIG. 11 is a block diagram of an illustrative method of mobile media presentation.

Referring now to FIG. 11, a flowchart of another illustrative method (1100) of mobile media presentation is shown. The method (1100) includes receiving (step 1101) streaming media content wirelessly in a portable electronic device. The media content is then reproduced (step 1103) on a first host device associated with a first docking station to which the portable electronic device is interfaced.

The stream of media content from the portable electronic device is paused (step 1105) and the portable electronic device is removed (step 1107) from the first docking station. The portable electronic device is then interfaced (step 1109) to a second docking station, and the stream of media content from the portable electronic device is then resumed (step 1111). The media content is then transmitted (step 1113) to the second host device through the second docking station.

In some embodiments, the display and reproduction of the media content may be continued by the portable electronic device between the disconnection (step 1107) from the first docking station and the interfacing (step 1109) to the second docking station. In other embodiments, the reproduction or playback of the media content may pause between docking stations.

Alternatively, the stream of media content from a content source to the portable electronic device may be paused when the portable electronic device is not interfaced to either the first or the second docking stations. This pause may be automatic or user-initiated.

Figure 12:
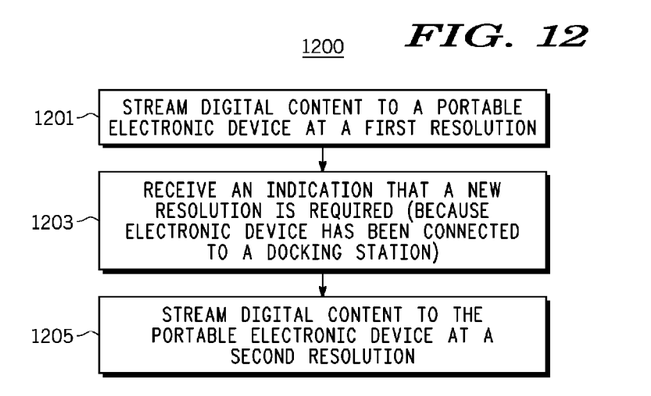
FIG. 12 is a block diagram of an illustrative method of mobile media presentation.

Referring now to FIG. 12, a flowchart of another method (1200) of mobile media presentation is shown. The method (1200) may be executed by a media content provider in communication with a portable electronic device.

The method (1200) includes streaming (step 1201) digital content to a portable electronic device in a first format, for example, at a first resolution. An indication is then received (step 1203) that the format should be changed to a different format, for example, at a second resolution. This is triggered by the electronic device being interfaced with a docking station and the determination that the host device requires a different format. The docking station may be configured to receive media content streamed from the portable electronic device and transmit the media content to a media presentation host device.

The indication may be in the form of digital data transmitted from the portable electronic device back to the media content provider. The indication may include data specifying a type of host device in communication with the docking station and the appropriate format for a media content signal to be played back by that host device.

Once the indication has been received (step 1203) that a second format is needed, i.e. the electronic device has been interfaced with the docking station, digital content is streamed (step 1205) to the portable electronic device in a second format corresponding to the needs of the indicated host device. For example, the first format may be a resolution used to display the media content on the portable electronic device, and the second format may be the resolution used to display the media content on the host device.

The preceding description has been presented only to illustrate and describe embodiments and examples of the principles described. This description is not intended to be exhaustive or to limit these principles to any precise form disclosed. Many modifications and variations are possible in light of the above teaching.

The process shown in FIGS. 9-12, for example, and described in this specification may be implemented in a general, multi-purpose or single purpose processor. Such a processor will execute instructions, either at the assembly, compiled or machine-level, to perform that process. Those instructions can be written by one of ordinary skill in the art following the description of FIGS. 9-12 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

What is claimed is:

1. A portable electronic device, said device comprising:
   a wireless receiver configured to receive wireless content comprising streaming video;

a communication interface configured to interface to any one of a first docking station having at least a first connected media presentation host device, and a second docking station having at least a second connected media presentation host device; and content reproduction circuitry; wherein said content reproduction circuitry is configured to:
- determine, upon connection via said first docking station to said first connected media presentation host device, a first format required by said first media presentation host device;
- stream said content to said first media presentation host device through said communication interface in said first format;
- pause streaming of said content to corresponding media presentation host device when said portable electronic device is removed from said first docking station;
- determine, upon connection via said second docking station to said second connected media presentation host device, a second format required by said second media presentation host device; and
- resume said streaming of said content to said second media presentation host device, in said second format, when said portable electronic device is interfaced with said second docking station.

2. The portable electronic device of claim 1, wherein said portable electronic device further comprises circuitry configured to detect a first connection to said first media presentation host device.

3. The portable electronic device of claim 1, further comprising a wireless transmitter configured to communicate with a source of said wireless content.

4. The portable electronic device of claim 1, further comprising a display screen.

5. The portable electronic device of claim 4, wherein said content reproduction circuitry is further configured to reproduce said content on said display screen when said portable electronic device is not connected to said first docking station and said second docking station.

6. The portable electronic device of claim 1, wherein said reproduction circuitry is further configured to convert said wireless content from a format into said first format required by said first media presentation host device.

7. The portable electronic device of claim 1, wherein said first format required by said first media presentation host device is selected from the group consisting of: television broadcast formats, radio broadcast formats, high-definition video formats, high-definition audio formats, conventional analog video formats, conventional analog audio formats, streaming video formats, and combinations and derivatives thereof.

8. The portable electronic device of claim 1, wherein said portable electronic device further comprises circuitry configured to detect a second connection to said second media presentation host device.

9. The portable electronic device of claim 1, wherein said second format required by said second media presentation host device is selected from the group consisting of: television broadcast formats, radio broadcast formats, high-definition video formats, high-definition audio formats, conventional analog video formats, conventional analog audio formats, streaming video formats, and combinations and derivatives thereof.

10. A method of mobile media presentation, performed by a portable electronic device in wireless communication with a remote content provider, the method comprising:
- receiving content comprising streaming video from said remote content provider;
- transmitting said content, in a first format, to a first media presentation host device;
- pausing said transmission of said content to said first media presentation host device when said portable electronic device is removed from a first docking station of said first media presentation host device; and
- resuming said transmission of said content, in a second format, to a second media presentation host device when said portable electronic device is interfaced with a second docking station of said second media presentation host device.

11. The method of claim 10, wherein said portable electronic device comprises a media reproduction apparatus selected from the group consisting of: display screens, speakers, and combinations thereof.

12. The method of claim 10, wherein said portable electronic device is configured to reproduce said content on said display screen when not transmitting said content to said first media presentation host device and said second media presentation host device.

13. The method of claim 10,
- wherein said portable electronic device comprises interface circuitry configured to selectively connect with said first docking station; and
- wherein said first docking station is in communication with said first media presentation host device.

14. The method of claim 13, wherein said interface circuitry is further configured to detect a first connection to said first docking station and retrieve first resolution information from said first media presentation host device upon said first detection.

15. The method of claim 10, wherein said portable electronic device is configured to transmit a request to said remote content provider to change a first resolution of said content upon detecting a change in connection status of said first docking station.

16. The method of claim 10, wherein said first and second formats are selected from the group consisting of: television broadcast formats, radio broadcast formats, high-definition video formats, high-definition audio formats, conventional analog video formats, conventional analog audio formats, streaming video formats, and combinations and derivatives thereof.

17. The method of claim 10, further comprising:
- selectively connecting with said second docking station, wherein said second docking station is in communication with said second media presentation host device.

18. The method of claim 17, further comprising:
- detecting a second connection to said second docking station; and
- retrieving second resolution information from said second media presentation host device upon said second detecting.

19. The method of claim 10, further comprising:
- transmitting a request to said remote content provider to change a second resolution of said content upon detecting a change in connection status of said second docking station.

20. A non-transitory computer readable storage medium comprising stored instructions which, when executed by one or more processors of a portable electronic device in wireless communication with a remote content provider, cause the portable electronic device to perform a method of mobile media presentation, the method comprising:

receiving content comprising streaming video from said remote content provider;
transmitting said content, in a first format, to a first media presentation host device;
pausing said transmission of said content to said first media presentation host device when said portable electronic device is removed from a first docking station of said first media presentation host device; and
resuming said transmission of said content, in a second format, to a second media presentation host device when said portable electronic device is interfaced with a second docking station of said second media presentation host device.

\* \* \* \* \*